UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

COMPOSITE TITANIC-OXID PIGMENT, AND METHOD OF PRODUCING THE SAME.

1,236,655.　　　Specification of Letters Patent.　　Patented Aug. 14, 1917.

No Drawing.　　Application filed July 14, 1914.　Serial No. 850,875.

*To all whom it may concern:*

Be it known that I, LOUIS E. BARTON, a citizen of the United States, and a resident of Niagara Falls, in the county of Niagara and State of New York, have invented certain new and useful Composite Titanic-Oxid Pigments, and Methods of Producing the Same, of which the following is a specification.

My present invention relates to substances, employed as pigments in paint, and particularly to those containing important percentages of titanic oxid. Its objects comprise provision of methods whereby, on industrial scales, with economy and relatively slight technical skill or care, such pigments are producible, substantially white in color, and in which a given proportion of titanic oxid will produce its characteristic beneficial effects in a greater and more perfect degree than hitherto, particularly as regards the hiding power of the pigment when mixed as usual with oil and spread as paint.

The increased hiding power thus imparted to oil paint by my novel composite titanic oxid pigments seems attributable only to my novel methods of producing them, which result in an extremely, if not unprecedently, minute subdivision of the titanic constituent and its peculiar attachment to, or coalescence with, suspended minute particles of a sulfate base, or "extender", usually preponderating, but which has, however, by itself, in oil, no hiding power; and I am satisfied that equally good results are unattainable through any mere mechanical mixing of the same or even greater proportions of any titanic material with similar bases otherwise produced.

It is known that soluble salts of the alkali-earths react with solutions of sulfates to form precipitates of insoluble sulfate; and it is also known that acid solutions of titanic acid when much diluted and boiled precipitate titanic acid; but I have discovered that if to a comparatively concentrated solution of titanic sulfate, a soluble salt (such as calcium chlorid, or barium chlorid,) capable of forming by reaction with sulfuric acid an insoluble sulfate, be added, and the precipitated sulfate be allowed to remain in suspension while the charge is digested (not boiled); the precipitation of titanic acid is accelerated and the yield greatly increased notwithstanding the high concentration of the solution; and furthermore the titanic oxid under these conditions is precipitated in an extremely fine state of division and seems to attach itself to the suspended particles of sulfate base in a manner analogous to that in which organic coloring matter, precipitated from solution, attaches to suspended particles, in the preparation of lake-pigments for example.

The product resulting from my said discovery appears to be in the nature of an "adsorption-compound", or a coalescence of colloidal titanic acid and sulfate particles.

My methods are practised and my novel composite products attained as follows:—

I first obtain, in any convenient manner, a titanic sulfate solution, as free from impurities as possible. I can use any titaniferous material which can be brought into sulfuric acid solution, as, for example, titaniferous iron ore, or ilmenite, dissolved in sulfuric acid, or first fused with alkali compounds and subsequently dissolved in sulfuric acid, but I prefer to use, on account of their comparative freedom from objectionable impurities, such as iron oxid, and also because they are so easily dissolved by sulfuric acid, the dried, uncalcined, products resulting from either of the procedures jointly invented by Auguste J. Rossi and myself, for which have been granted to us Letters Patent No. 1,106,409 and No. 1,106,410, both dated August 11, 1914, and No. 1,171,542, dated February 15, 1916.

By our said procedures the desired material is, generally speaking, obtained by aid of melting titanic oxid together with sulfid of an alkali metal, or with sulfate of an alkali metal and carbon, lixiviating the resulting melts and boiling the residue in dilute sulfuric acid:—the resulting dried products consisting preponderatingly of titanic oxid in the form of soft, gray powder, their constituents being, as shown by analyses, variable within the following limits, viz:—

| | |
|---|---|
| Titanic oxid | 65 to 80% |
| Silica | 1 to 5% |
| Iron oxid | 1 to 7% |
| Soda | 2 to 15% |
| Sulfur (free) | 1 to 15% |
| Sulfuric anhydrid | $\frac{1}{10}$ to 1% |

Preferably such a titaniferous material, or titanic oxid concentrate, I digest at a temperature of 100° C. to 150° C. in an iron, or other refractory, vessel with 95% sulfuric acid in the proportion of 2.5 to 2.6 parts, by weight, of sulfuric acid to one part by weight of the titanic oxid. I continue the digestion until a sample taken from the digester shows by analysis a practically complete combination of the sulfuric acid with the bases. Under these conditions 85% to 95% of the titanic oxid of the charge will be combined with sulfuric acid as titanic sulfate. This mass of materials I then remove from the digester to a lead-lined, or other, refractory vessel, and therein dissolve them in water, the volume of which is about three times that of the sulfuric acid used in the charge. The resulting solution is of suitable concentration for filtration from any undissolved residue and of convenient volume for storage.

To say 140 parts, by weight, of this titanic sulfate solution having a specific gravity of about 1.40 and containing approximately 15% of titanic oxid, I add a solution, preferably hot, of about 96 parts of barium chlorid ($BaCl_2$), the exact chemically equivalent quantity of said chlorid being calculated from the total sulfuric acid as determined by analysis of the titanic sulfate solution,—and the volume of the mixed solutions made up by additions of water to about 2.5 times that of the original titanic sulfate solution used.

This mixed solution containing, immediately precipitated, suspended, barium sulfate I then treat in any convenient manner so as to promote precipitation of titanic acid, as for example by digesting it at about 100° C. for two to four hours in a closed vessel, preferably connected with a reflux condenser by which any small quantity of acid vapor is returned to the digester. The completion of the digesting operation can be determined by withdrawing a sample of the charge and determining approximately the percentage of titanic oxid remaining in solution.

I next filter out the composite precipitated product, wash it with either hot or cold water, and calcine it at a red heat until free from volatile matter (i. e. combined water).

The result of all the operations, including calcination, may be indicated by the following equation, viz:—

Pigment product

From this equation the theoretical composition of the product is:—

Titanic oxid ($TiO_2$)_____ 14.66%
Barium sulfate ($BaSO_4$)_____ 85.34%

But the chemical composition may be influenced by the presence in the original sulfate solution of more or less impurities, as, for example, sulfates other than titanic sulfate, and by the incompleteness of precipitation of the titanic oxid; and I have found by many operations as last described that the composition will, in practice, vary about as follows:—

Titanic oxid ($TiO_2$)_____ 12% to 14%
Barium sulfate ($BaSO_4$)_____ 86% to 88% and that the specific gravity varies from 3.95 to 4.10 depending on the above variances in composition.

It will be noted that as a result of calcination the barium sulfate constituent of the product is the amorphous precipitated variety known as "blanc fixe", and not the crystalline form of natural barium sulfate known as barytes.

A complete analysis of one lot of my product showed the composition—

Titanic oxid _____ 12.79%
Barium sulfate _____ 86.72
Iron oxid _____ .31
Chlorin _____ none.
Loss upon ignition_____ .02

Specific gravity _____ 4.07

As to my resulting final composite titanic oxid product the following characteristics are notable, viz:

Their titanic oxid constituents are white, amorphous, or non-crystalline, and, I believe, chemically uncombined with other substances.

Their barium sulfate constituents are amorphous and exceedingly minutely subdivided, their exceptional minuteness being, I believe, attributable to the colloidal character of the solution and the precipitation therein occurring. These very minute barium sulfate particles are more or less coated with the said amorphous titanic oxid which is thereto externally adherent, thus imparting to them and so also to my pigments, as a whole, their hiding power and other desirable qualities.

My composite titanic oxid pigment is therefore, when produced by aid of barium chlorid, as aforesaid, characterizable and distinguishable as comprising titanic oxid and sulfate, usually in the proportion of from 12% to 14% of the former to 86% to 88% of the latter; and as containing also iron oxid, say from traces to .40%; as of specific gravity say from 3.95 to 4.10; and as being, after calcination, a soft, fine, amorphous powder, in color white with tinge of cream; as containing barium sulfate particles in minute amorphous form and titanic oxid particles in more minute amorphous form coalesced with, or coating, said sulfate particles, i. e. adhering to the latter externally.

The exceptional merits of my composite titanic pigments will be appreciated from the fact that notwithstanding they contain such comparatively low percentages of titanic oxid possessing hiding power, and such much greater percentages of a sulfate which of itself has no hiding power, their hiding power when mixed with oil for paint is fully equal to that of pigments containing 100% of the previously usually employed lead or zinc compounds.

I can hasten the operation, in some cases, if desired, by occasionally stirring, or agitating, the solution, thus hastening the reactions.

I can also, if, in some cases, thought advisable to increase the percentage of titanic oxid in the final product, accomplish this from a given charge of the original titanic sulfate solution, by the following modifications of my heretofore described process, viz:—

I first add to said titanic sulfate solution calcium chlorid in quantity sufficient to precipitate part only of the sulfuric acid as calcium sulfate. This calcium sulfate precipitate I immediately filter off, and I then add to the filtrate barium sulfate in quantity calculated to precipitate the remainder of the sulfuric acid with resulting barium sulfate and titanic acid precipitations. I can thus correspondingly decrease the percentage of sulfate and increase the percentage of titanic oxid in the final calcined product, in other respects the operations are conducted as before described.

Thus, for example, to a solution of titanic sulfate containing 3.6 parts of titanic oxid and 10 parts of sulfuric acid, I added 5.7 parts of calcium chlorid, which was sufficient to precipitate half of the sulfuric acid. The precipitate of calcium sulfate formed I immediately filtered off, and then added to the filtrate 12.5 parts of barium chlorid operating otherwise as heretofore described.

The final product, after calcining, analyzed:—

Titanic oxid _____ 20.10%
Barium sulfate___ 79.90% (by difference)

This case does not contain claims broadly covering my said methods and their products because these are incorporated in Letters Patent No. 1,155,462, dated October 5, 1915, and granted on my application Serial Number 850,876, filed July 14, 1914.

What I claim is:—

1. The method of treating a titanic sulfate solution which comprises adding thereto chlorid of barium and digesting the mass so as to produce a composite precipitate comprising an insoluble sulfate and titanic acid.

2. The method of making pigments containing titanic oxid which comprises digesting a titanic compound in sulfuric acid until titanic sulfate is formed, adding chlorid of barium, treating the mixture to promote precipitation of titanic acid, separating the resulting precipitates from the solution, and calcining them.

3. The method of making pigments containing titanic oxid which comprises digesting a titanic compound in sulfuric acid until titanic sulfate is formed, adding a solution of chlorid of barium, treating the mixture to promote precipitation of titanic acid, separating the resulting precipitates from the solution, and calcining them.

4. In the production of pigments containing titanic oxid the steps which consist in adding to a titanic sulfate solution a solution of chlorid of barium, and digesting the mixture at about 100° C. until insoluble sulfate of barium and titanic acid have been precipitated.

5. The method of making pigments containing titanic oxid which comprises digesting a titanic compound in sulfuric acid until titanic sulfate is formed, adding chlorid of calcium in quantity insufficient to combine with all of the sulfate in solution, filtering out the resulting precipitate, adding to the filtrate chlorid of barium, separating therefrom precipitates of sulfates and titanic acid, and drying and calcining them.

6. As a new article a composite pigment comprising titanic oxid and barium sulfate.

7. As a new article a composite pigment comprising some titanic oxid and more barium sulfate.

8. As a new article a composite pigment comprising barium sulfate and thereto adhering titanic oxid.

9. As a new article a composite pigment comprising amorphous particles of barium sulfate and thereto adhering smaller particles of titanic oxid.

10. As a new article a composite pigment comprising titanic oxid, barium sulfate, and also iron oxid.

11. As a new article a composite pigment comprising barium sulfate, titanic oxid less than barium sulfate, and iron oxid less than titanic oxid.

12. As a new article a composite pigment containing principally amorphous barium sulfate, also less of amorphous titanic oxid, and iron oxid in quantity less than said titanic oxid.

13. As a new article a composite pigment containing iron oxid, also particles of amorphous barium sulfate and thereto adhering smaller particles of titanic oxid.

14. As a new article a composite titanic oxid pigment, of specific gravity 3.95 to 4.10, in the form of a soft, fine, amorphous powder, in color white with tinge of cream, containing a preponderance of particles of amorphous barium sulfate and thereto adhering particles of titanic oxid.

15. As a new article a composite titanic oxid pigment, of specific gravity 3.95 to 4.10, in the form of soft, fine, amorphous powder, in color white with tinge of cream, containing iron oxid and a preponderance of particles of amorphous barium sulfate and thereto adhering particles of titanic oxid.

16. As a new article a composite titanic oxid pigment, of specific gravity 3.95 to 4.10, in the form of a soft, fine, amorphous powder, in color white with tinge of cream, containing iron oxid not to exceed 0.5%, barium sulfate 85% to 89%, and titanic oxid 11% to 15%.

LOUIS E. BARTON.

Witnesses:
 WM. V. KNOWLES,
 C. J. KINZIE.